United States Patent
Hokari et al.

(10) Patent No.: US 8,029,395 B2
(45) Date of Patent: Oct. 4, 2011

(54) HYDRAULIC ACTUATOR FOR BELT TYPE CONTINUOUSLY VARIABLE TRANSMISSION

(75) Inventors: Satoshi Hokari, Tokyo (JP); Hiroshi Ogawa, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 261 days.

(21) Appl. No.: 12/471,014

(22) Filed: May 22, 2009

(65) Prior Publication Data

US 2009/0291788 A1 Nov. 26, 2009

(30) Foreign Application Priority Data

May 26, 2008 (JP) ................. 2008-136215

(51) Int. Cl.
*F16H 61/662* (2006.01)
*F16H 9/18* (2006.01)
*F16H 55/52* (2006.01)
(52) U.S. Cl. ............... 474/28; 474/17; 474/18
(58) Field of Classification Search .............. 474/18, 474/28, 8, 17
See application file for complete search history.

(56) References Cited

U.S. PATENT DOCUMENTS

| | | | | |
|---|---|---|---|---|
| 4,552,545 A * | 11/1985 | Koivunen | | 474/16 |
| 5,244,437 A * | 9/1993 | Haley et al. | | 474/18 |
| 5,776,022 A * | 7/1998 | Schellekens | | 474/18 |
| 6,302,971 B1 * | 10/2001 | Ohara et al. | | 148/210 |
| 6,443,864 B1 * | 9/2002 | Friedmann | | 474/18 |
| 6,835,147 B2 * | 12/2004 | Iwata et al. | | 474/28 |
| 2001/0031678 A1 * | 10/2001 | Schmid et al. | | 474/18 |
| 2001/0044350 A1 * | 11/2001 | Nishigaya et al. | | 474/18 |
| 2005/0197221 A1 * | 9/2005 | Nozawa et al. | | 474/18 |

FOREIGN PATENT DOCUMENTS

| | | | |
|---|---|---|---|
| JP | 2-62449 | | 3/1990 |
| JP | 3-33542 | | 2/1991 |
| JP | 2005140232 A | * | 6/2005 |

* cited by examiner

*Primary Examiner* — Michael R Mansen
*Assistant Examiner* — Minh Truong
(74) *Attorney, Agent, or Firm* — Smith, Gambrell & Russell, LLP

(57) ABSTRACT

A hydraulic actuator for a belt type continuously variable transmission, with which a smooth operation is secured and both superior productivity and reduced manufacturing costs can be expected, includes a first cylinder provided on a movable sheave, a drum having a first drum portion that covers the first cylinder and a second drum portion that is fitted to a boss portion of the movable sheave and formed with a plurality of projections, a first plunger having a cylindrical portion that is fitted to the first cylinder and the second drum portion to form a first hydraulic chamber, and a second plunger fitted to the cylindrical portion and the first cylinder to form a second hydraulic chamber. An oil passage connecting the first hydraulic chamber and the second hydraulic chamber is formed by a gap between the second drum portion and cylindrical portion, which are fitted together.

4 Claims, 8 Drawing Sheets

US 8,029,395 B2

HYDRAULIC ACTUATOR FOR BELT TYPE CONTINUOUSLY VARIABLE TRANSMISSION

CROSS-REFERENCE TO RELATED APPLICATIONS

This application is based upon and claims the benefit of priority from the prior Japanese Patent Application No. 2008-136215, filed on May 26, 2008; the entire content of which is incorporated herein by reference.

BACKGROUND OF THE INVENTION

1. Field of the Invention

The present invention relates to a belt type continuously variable transmission used as a continuously variable transmission for a vehicle, for example, and more particularly to a hydraulic actuator for a belt type continuously variable transmission in which a pulley groove width is varied by moving a movable sheave that is disposed opposite to a fixed sheave formed integrally with a pulley shaft.

2. Description of the Related Art

A belt type continuously variable transmission includes: a primary shaft and a secondary shaft disposed in parallel; a primary pulley having a fixed sheave formed integrally with the primary shaft and a movable sheave that is disposed opposite to the fixed sheave and is capable of moving in an axial direction; a secondary pulley having a fixed sheave formed integrally with the secondary shaft and a movable sheave that is disposed opposite to the fixed sheave and is capable of moving in the axial direction; a driving belt wound around the pulleys; and an actuator for moving the movable pulleys in the axial direction. The belt type continuously variable transmission performs speed shifts continuously by employing the actuator to move the movable sheaves, thereby varying a pulley groove width such that a ratio of an effective winding diameter of the driving belt relative to the respective pulleys is varied.

Incidentally, a hydraulic actuator is used as an actuator for moving the movable sheave of the pulley in the axial direction, for example, Japanese Unexamined Patent Application No. H2-62449 and Japanese Unexamined Patent Application No. H3-33542 have proposed a hydraulic actuator known as a tandem type hydraulic actuator for securing an increase in a pushing force applied to the movable sheave without an increase in outer diameter.

The tandem type hydraulic actuator disclosed in Japanese Unexamined Patent Application No. H2-62449 will now be described with reference to FIG. 7, which is a sectional view showing the main parts of a belt type continuously variable transmission.

A primary pulley 102 includes a fixed sheave 103 formed integrally with a primary shaft 101 and a movable sheave 104 that is disposed opposite to the fixed sheave 103 and is capable of moving in an axial direction, and a hydraulic actuator 105 for moving the movable sheave 104 in the axial direction is disposed between a back surface of the movable sheave 104 and the primary shaft 101.

The hydraulic actuator 105 includes a cylindrical first cylinder 106 that projects from an outer periphery of the movable sheave 104 toward the back surface side, a fixed wall 107 having an outer periphery that is fitted slidably to an inner peripheral surface of the first cylinder 106 and formed with a tubular portion 107a, an inner periphery of which is fixed to the primary shaft 101 such that a first hydraulic chamber A is formed between the fixed wall 107 and the movable sheave 104, a drum 108 having a cylindrical second cylinder 108a that covers an outer side of the first cylinder 106 so as to overlap the first cylinder 106 in an axial direction, an inner periphery of which is fixed to the primary shaft 101, and a cylindrical plunger 109 having an inner peripheral surface that is fitted slidably to an outer peripheral surface of the tubular portion 107a and an outer periphery that is fitted slidably between the inner periphery of the second cylinder 108a and the first cylinder 106 such that a second hydraulic chamber B is formed between the plunger 109 and the drum 108.

An oil pressure supply passage 101a is formed in the interior of the primary shaft 101, and working oil pressure introduced into the oil pressure supply passage 101a is supplied to the first hydraulic chamber A via a passage 101b formed in the primary shaft 101 in a diametrical direction and supplied to the second hydraulic chamber B via an oil hole 107b formed in an inner peripheral portion of the fixed wall 107. The movable sheave 104 is pushed in the direction of the fixed sheave 103 directly by the working oil pressure of the first hydraulic chamber A, and the plunger 109 is moved by the working oil pressure of the second hydraulic chamber B. The moving force of the plunger 109 is transmitted to the movable sheave 104 to move the movable sheave 104 in the same direction together with the pushing force of the first hydraulic chamber A. As a result, a pulley groove width of the primary pulley 102 is narrowed. Accordingly, an effective winding diameter of a driving belt 110 wound around the primary pulley 102 increases, leading to an increase in a gear ratio that is transmitted to a secondary pulley, not shown in the drawing.

Meanwhile, when the working oil pressure is discharged from the first hydraulic chamber A and the second hydraulic chamber B, the movable sheave 104 and the plunger 109 are moved in a direction heading away from the fixed sheave 103 by tension in the driving belt 110. As a result, the effective winding diameter of the driving belt 110 wound around the primary pulley 102 decreases, decreasing the gear ratio relative to the secondary pulley.

The tandem type hydraulic actuator disclosed in Japanese Unexamined Patent Application No. H3-33542 will now be described with reference to FIG. 8, which is a sectional view showing the main parts of a belt type continuously variable transmission.

A primary pulley 112 includes a fixed sheave 113 formed integrally with a primary shaft 111 and a movable sheave 114 that is disposed opposite to the fixed sheave 113 and is capable of moving in an axial direction, and a hydraulic actuator 115 for moving the movable sheave 114 in the axial direction is disposed between a back surface of the movable sheave 114 and the primary shaft 111.

The hydraulic actuator 115 includes a cylindrical first cylinder 116 that projects from an outer periphery of the movable sheave 114 toward the back surface side, a drum 117 that is fixed to the primary shaft 111 and includes, on its outer periphery, a second cylinder 117a that covers an outer side of the first cylinder 116 so as to overlap the first cylinder 116 in the axial direction, a first plunger 118 that includes a tubular portion 118a formed in a tubular shape, an inner end of which is press-fitted fixedly into a press fitting groove 117b formed in a ring shape in a side face of the drum 117 and an outer end of which is fitted slidably to an inner peripheral surface of the first cylinder 116, whereby a first hydraulic chamber A is formed between the first plunger 118 and the movable sheave 114, and a second plunger 119 having an outer periphery that is fitted slidably to the inner peripheral surface of the first cylinder 116 and an inner periphery that is fitted slidably to the tubular portion 118a of the first plunger 118, whereby a second hydraulic chamber B is formed between the second plunger 119 and the drum 117.

An oil pressure supply passage 111a is formed in the interior of the primary shaft 111, and working oil pressure from the oil pressure supply passage 111a is supplied to the first hydraulic chamber A and the second hydraulic chamber B. The movable sheave 114 is pushed in the direction of the fixed sheave 113 directly by the working oil pressure of the first hydraulic chamber A, and the second plunger 119 is moved by the working oil pressure of the second hydraulic chamber B. The moving force of the plunger 119 is transmitted to the movable sheave 114 so as to move the movable sheave 114 in the same direction together with the pushing force of the first hydraulic chamber A. As a result, a pulley groove width of the primary pulley 112 is narrowed. Accordingly, the effective winding diameter of a driving belt 120 wound around the primary pulley 112 increases, leading to an increase in the gear ratio that is transmitted to a secondary pulley, not shown in the drawing.

Meanwhile, when the working oil pressure is discharged from the first hydraulic chamber A and the second hydraulic chamber B, the movable sheave 114 and the second plunger 119 are moved in a direction heading away from the fixed sheave 113 by tension in the driving belt 120. As a result, the effective winding diameter of the driving belt 120 decreases, decreasing the gear ratio relative to the secondary pulley.

According to the hydraulic actuators of the belt type continuously variable transmissions described in Japanese Unexamined Patent Application No. H2-62449 and Japanese Unexamined Patent Application No. H3-33542, the first hydraulic chamber and the second hydraulic chamber are disposed coaxially with the primary shaft, and therefore the pushing force applied to the movable sheave can be increased without increasing in outer diameter.

However, in Japanese Unexamined Patent Application No. H2-62449, the fixed wall 107 that forms the first hydraulic chamber A and supports the plunger 109 slidably is fixed integrally to the primary shaft 101, and therefore the oil passage 107b for supplying the working oil pressure from the oil pressure supply passage 101a of the primary shaft 101 to the second hydraulic chamber B must be drilled into the fixed wall 107. As a result, the constitution of the fixed wall 107 becomes complicated, and the labor involved in the drilling operation leads to an increase in manufacturing cost.

In Japanese Unexamined Patent Application No. H3-33542, meanwhile, the first hydraulic chamber A is formed between the first plunger 118 and the movable sheave 114 by fixedly press-fitting the tubular portion 118a of the first plunger 118 into the press fitting groove 117b formed in a ring shape in the side face of the drum 117, and the second hydraulic chamber B is formed between the drum 117 and the second plunger 119 by slidably fitting the inner periphery of the second plunger 119 into the tubular portion 118a.

Hence, the working oil pressure of the first hydraulic chamber A acts on the first plunger 118, and due to the need to secure a smooth operation in the second plunger 119, on which the working oil pressure of the second hydraulic chamber B acts, sufficient joining rigidity is required in a joint portion between the cylindrical portion 118a of the first plunger 118 and the drum 117, or in other words the press fitting groove 117b and the cylindrical portion 118a. Moreover, an oil passage for supplying working oil pressure to the second hydraulic chamber B must be formed on the end portion of the cylindrical portion 118a of the first plunger 118 and in an extremely restricted site that does not affect the fitting with the press fitting groove 117b, and therefore the constitution of the first plunger 118 becomes complicated and formation of the oil passage is troublesome, leading to an increase in manufacturing cost.

SUMMARY OF THE INVENTION

The present invention has been designed in consideration of these points, and it is an object thereof to provide a hydraulic actuator for a belt type continuously variable transmission with which a smooth operation can be secured and both superior productivity and reduced manufacturing costs can be expected.

To achieve the object described above, An aspect of the present invention provides a hydraulic actuator for a belt type continuously variable transmission which has a pulley that includes a fixed sheave formed integrally with a pulley shaft and a movable sheave disposed opposite to the fixed sheave to be capable of moving in an axial direction, a driving belt wound around the pulley, and a hydraulic actuator for moving the movable sheave in the axial direction, and which performs a speed shift by having the hydraulic actuator move the movable sheave such that a ratio of an effective winding diameter of the driving belt relative to the pulley is varied, including: a first cylinder that projects from a back surface of the movable sheave; a drum in which a first drum portion covering the first cylinder, a second drum portion having an inner end that is fitted slidably to an outer peripheral surface of a boss portion of the movable sheave, and a back surface portion connecting an end portion of the first drum portion and an end portion of the second drum portion are formed continuously; a first plunger having an outer periphery that is fitted slidably to an inner peripheral surface of the first cylinder and an inner periphery that contacts a projection formed on a peripheral surface of the second drum portion such that a first hydraulic chamber is formed between the outer periphery and the back surface of the movable sheave; a second plunger having an inner periphery that is fitted slidably to the first plunger and an outer periphery that is fitted slidably to the first drum portion such that a second hydraulic chamber is formed between the second plunger and the back surface portion of the drum; a second cylinder formed integrally with a base portion that is fixed to the pulley shaft and a cylinder portion that increases in diameter from the base portion and has an end that contacts the back surface portion of the drum; and a third plunger having an outer periphery that is fitted slidably to the cylinder portion of the second cylinder and an inner periphery that is fixed to the boss portion of the movable sheave such that a third hydraulic chamber is formed between the third plunger and the back surface portion of the second cylinder, wherein an oil passage that connects the first hydraulic chamber and the second hydraulic chamber is formed by a gap between the second drum portion and the first plunger, which are fitted together via the projection.

According to this invention, the first hydraulic chamber and the second hydraulic chamber communicate via the oil passage formed by the gap between an inner peripheral surface of the cylindrical portion of the first plunger and an outer peripheral surface of the second drum portion of the drum such that working oil pressure is supplied to both the first hydraulic chamber and the second hydraulic chamber. Hence, the movable sheave is pushed directly in the direction of the fixed sheave by the working oil pressure of the first hydraulic chamber, and the second plunger is moved by an actuating pressure of the second hydraulic chamber, which is generated when the working oil pressure of the second hydraulic chamber acts on a pressure receiving surface of the second plunger, whereupon the moving force of the second plunger is transmitted to the first cylinder so as to move the movable sheave in the same direction together with the pushing force of the first hydraulic chamber. Further, working oil pressure is introduced into the third hydraulic chamber so as to move the boss portion and thereby move the movable sheave in the same direction together with the respective pushing forces of the first hydraulic chamber and second hydraulic chamber, and as a result, a pulley groove width of the pulley is varied in accordance with the working oil pressure of the third hydraulic chamber, enabling a smooth speed shift.

In particular, support rigidity is secured in the first plunger by fitting the cylindrical portion of the first plunger to the second drum portion of the drum, thereby preventing the first plunger from tilting and swinging. Hence, smooth movement is secured in the second plunger, which moves while remaining slidably fitted to the first drum portion of the drum and the first plunger, and therefore smooth movement can be secured in the movable sheave in accordance with the hydraulic action of the first hydraulic chamber, second hydraulic chamber, and third hydraulic chamber. As a result, a smooth speed shift is obtained by varying the pulley groove width.

Further, since the first hydraulic chamber and second hydraulic chamber are connected via the oil passage formed by the gap between the inner peripheral surface of the cylindrical portion of the first plunger and the outer peripheral surface of the second drum portion of the drum, the need to drill an oil hole in the drum to supply working oil pressure to the first hydraulic chamber and second hydraulic chamber is eliminated, enabling constitutional simplification. Hence, the drum can be manufactured easily and at low cost by press-molding, which exhibits superior productivity, and therefore a reduction in manufacturing costs can be expected.

Preferably, the hydraulic actuator for a belt type continuously variable transmission has an oil passage that connects an oil supply passage provided in the pulley shaft and the first hydraulic chamber is formed in the boss portion of the movable sheave.

This invention realizes a working oil supply passage for introducing working oil into the first hydraulic chamber. By providing the oil passage connecting the first hydraulic chamber to the oil supply passage provided in the pulley shaft in the boss portion of the movable sheave, the hydraulic actuator according to claim 1 can be executed easily.

Preferably, the hydraulic actuator for a belt type continuously variable transmission has the back surface portion of the drum is formed in a ring shape by a ring-shaped first back surface portion that increases in diameter in planar form from an end portion of the second drum portion, and a second back surface portion which bulges in a ring shape from an outer periphery of the first back surface portion in the axial direction heading away from the back surface of the movable sheave, and an outer periphery of which forms a continuation of the first drum portion, the cylinder portion of the second cylinder is formed with a cylindrical end that is fitted into the second back surface portion of the drum so as to contact the first back surface portion, whereby the cylinder portion overlaps the drum in the axial direction, and the third plunger is fixed to the boss portion of the movable sheave within an axial direction range in which the drum and the cylinder portion overlap.

According to this invention, by overlapping the cylinder portion of the second cylinder and the drum in the axial direction and fixing the third plunger to the boss portion of the movable sheave within an axial direction range in which the drum and the cylinder portion overlap, an axial direction length of the hydraulic actuator can be reduced, leading to an improvement in the compactness of the hydraulic actuator.

According to the present invention, support rigidity is secured in the first plunger by fitting the cylindrical portion of the first plunger to the second drum portion of the drum, thereby preventing the first plunger from tilting and swinging. Hence, smooth movement can be secured in the movable sheave in accordance with the hydraulic action of the first hydraulic chamber, second hydraulic chamber, and third hydraulic chamber, and as a result, a smooth speed shift is obtained by varying the pulley groove width.

Further, since the first hydraulic chamber and second hydraulic chamber are connected via the oil passage formed by the gap between the inner peripheral surface of the cylindrical portion of the first plunger and the outer peripheral surface of the second drum portion of the drum, the need to drill an oil hole in the drum to supply working oil pressure to the first hydraulic chamber and second hydraulic chamber is eliminated, enabling constitutional simplification. Hence, the drum can be manufactured easily and at low cost by press-molding, which exhibits superior productivity, and therefore a reduction in manufacturing costs can be expected.

DESCRIPTION OF THE PREFERRED EMBODIMENTS

An embodiment of a hydraulic actuator for a belt type continuously variable transmission according to the present invention will be described below with reference to FIGS. 1 to 6, using a hydraulic actuator that varies a pulley groove width of a primary pulley as an example.

Figure 1:
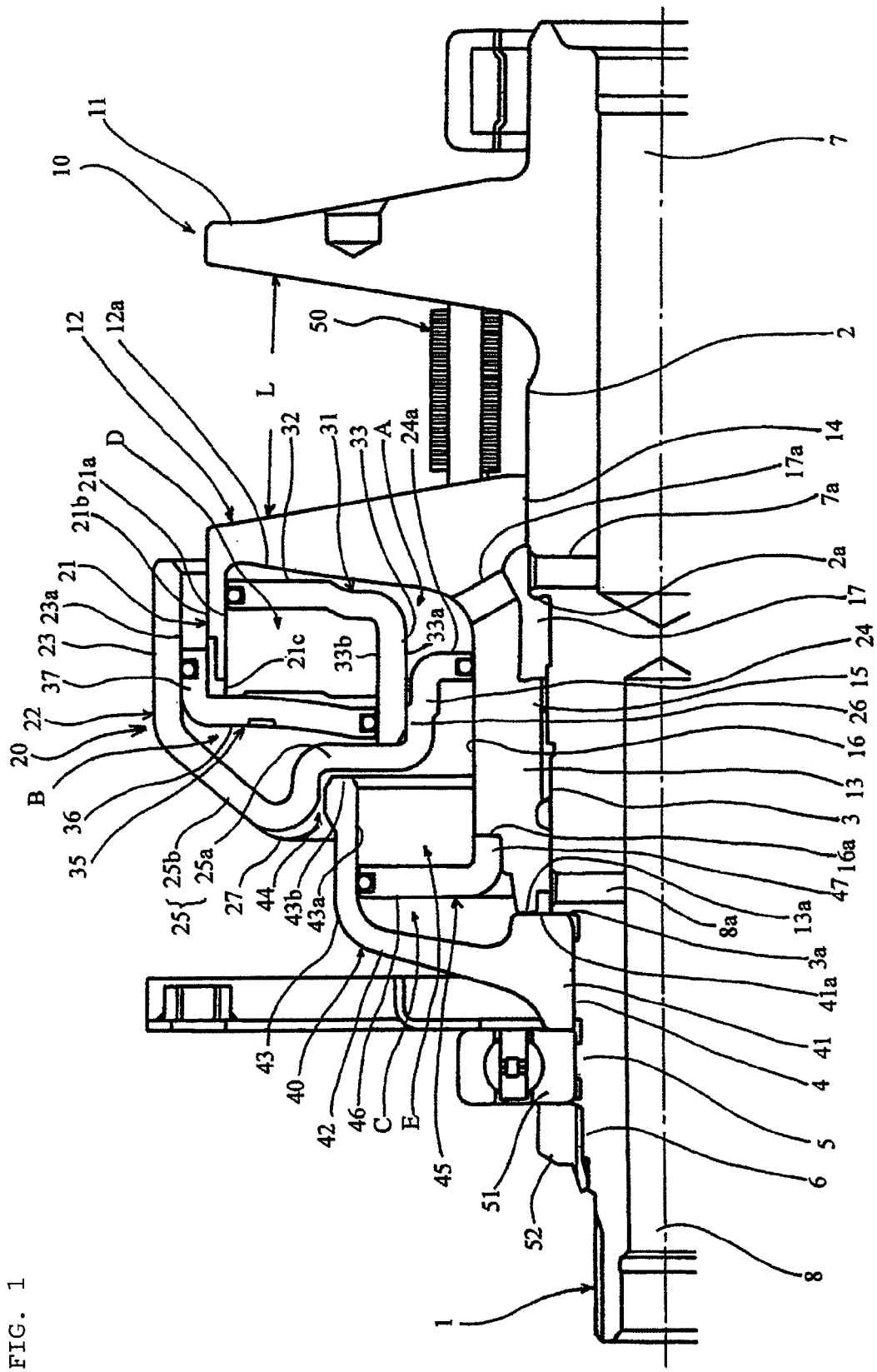
FIG. 1 is a sectional view showing the main parts of a hydraulic actuator for a belt type continuously variable transmission according to an embodiment when a pulley groove width is at a maximum.
Figure 2:
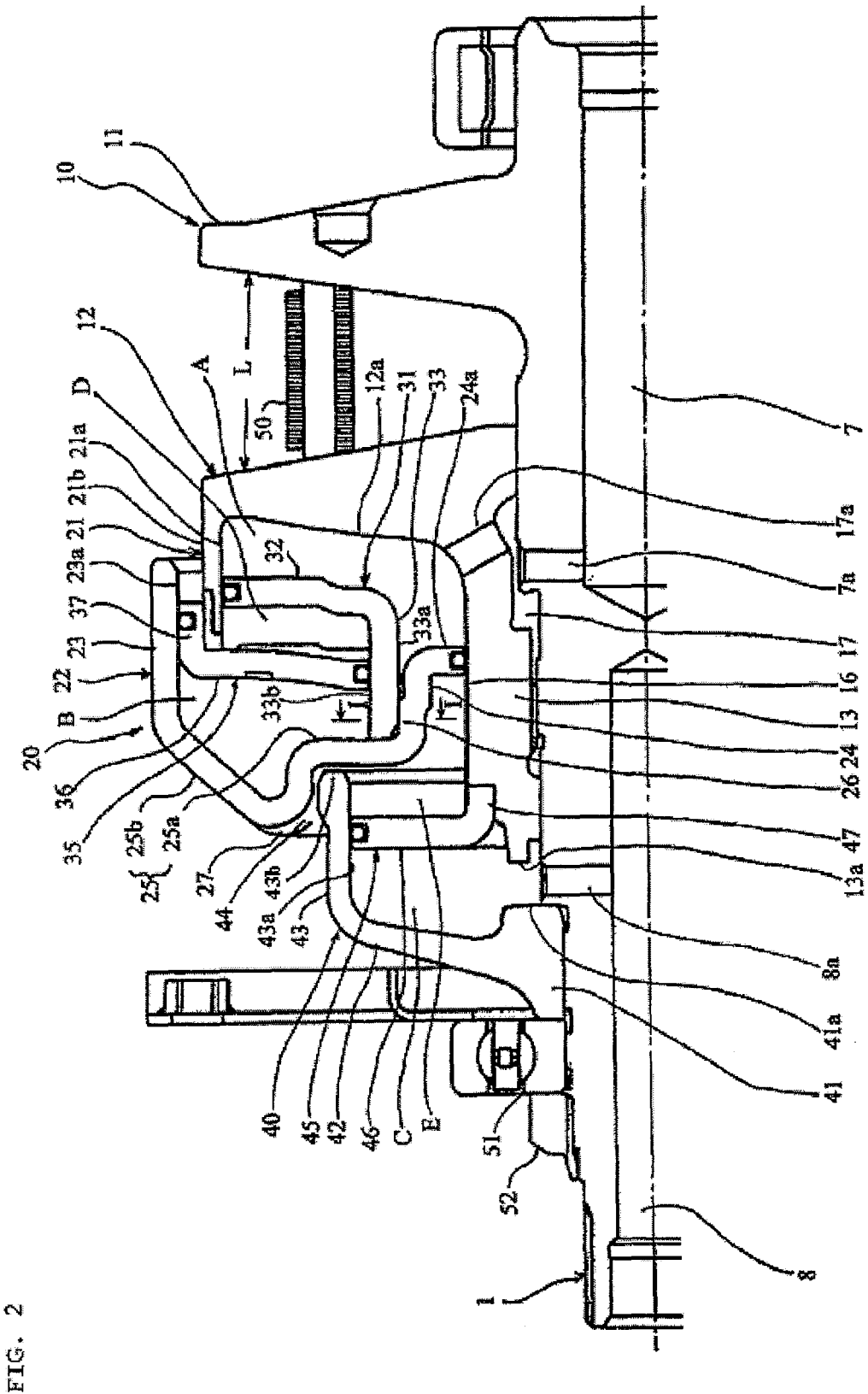
FIG. 2 is a sectional view showing the main parts of the hydraulic actuator for a belt type continuously variable transmission according to this embodiment when the pulley groove width is at a minimum.
Figure 3:
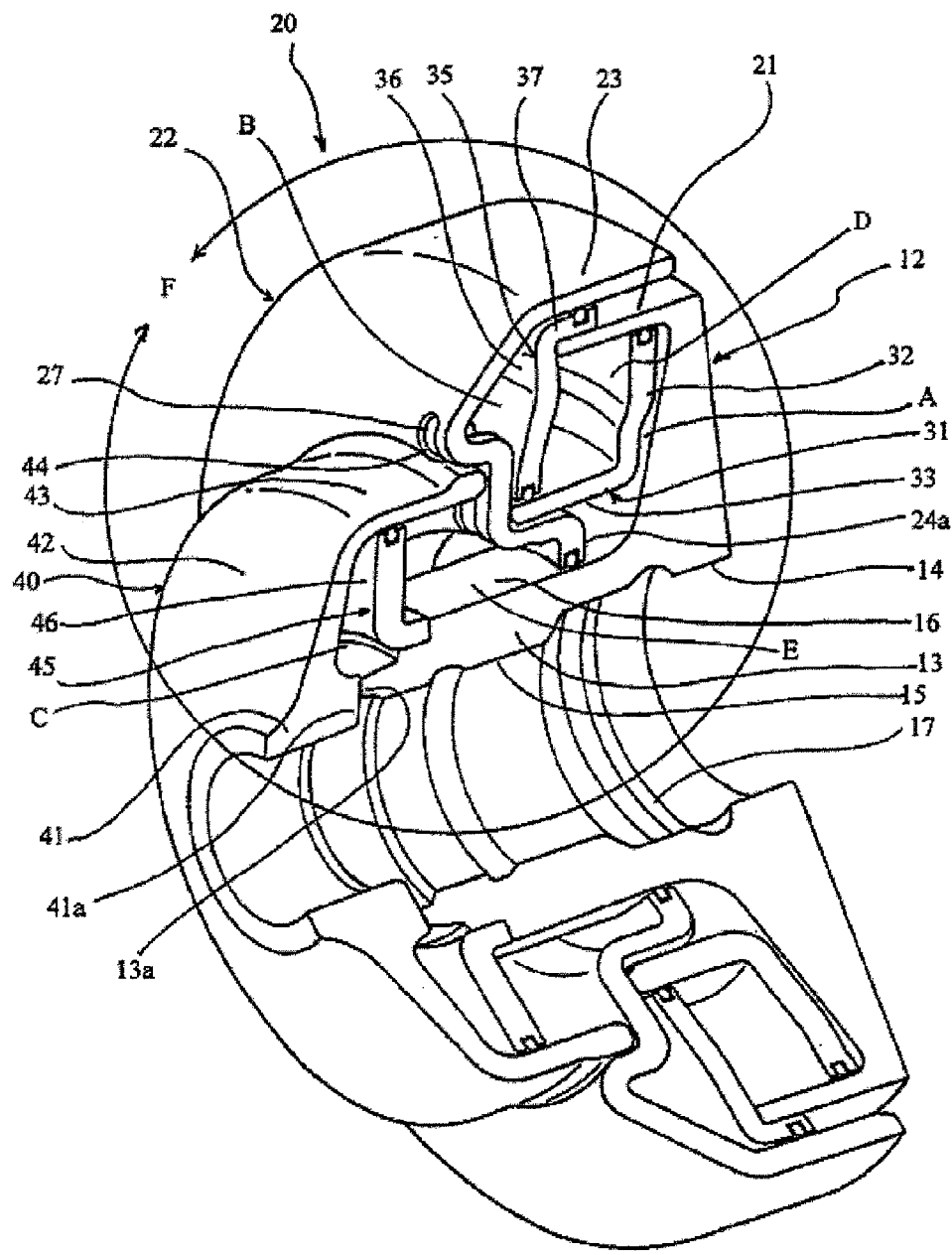
FIG. 3 is a partially cut-away perspective view of the hydraulic actuator.
Figure 4:
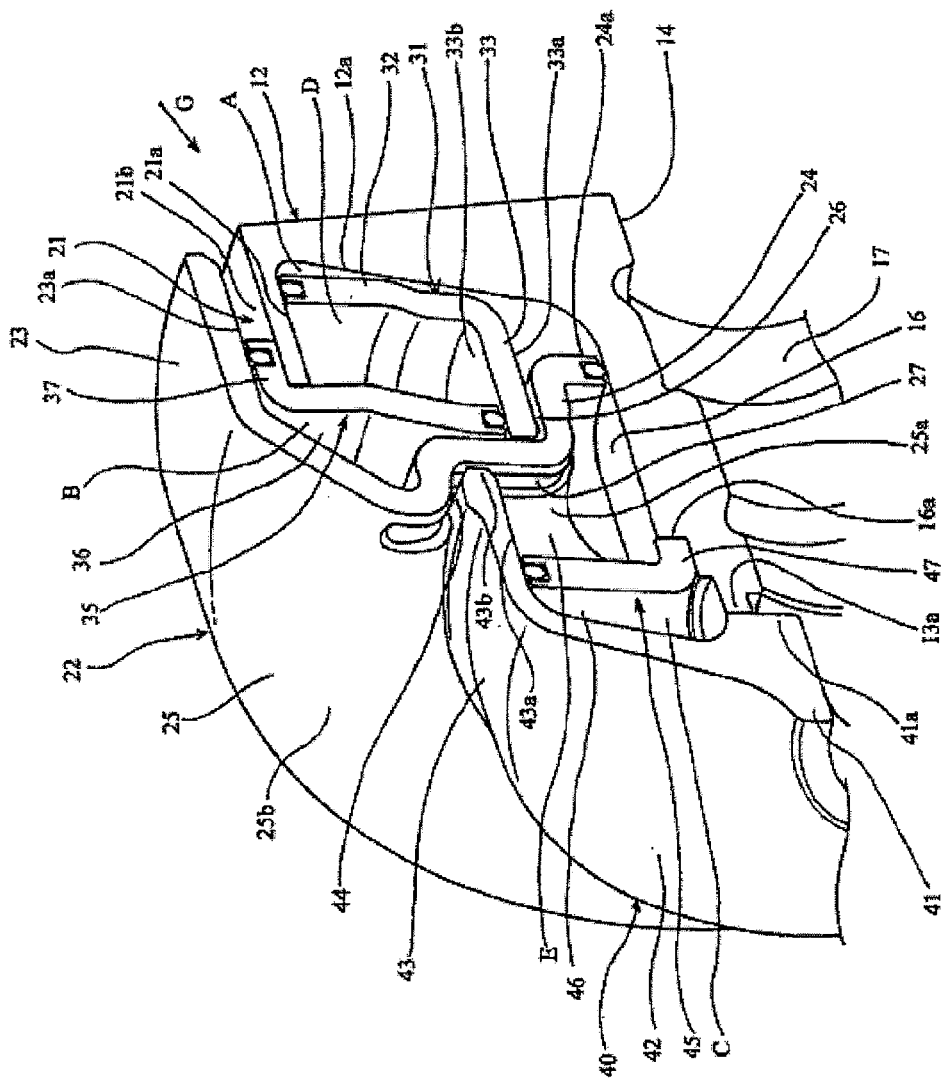
FIG. 4 is an enlarged view of an F portion of FIG. 3.
Figure 5:
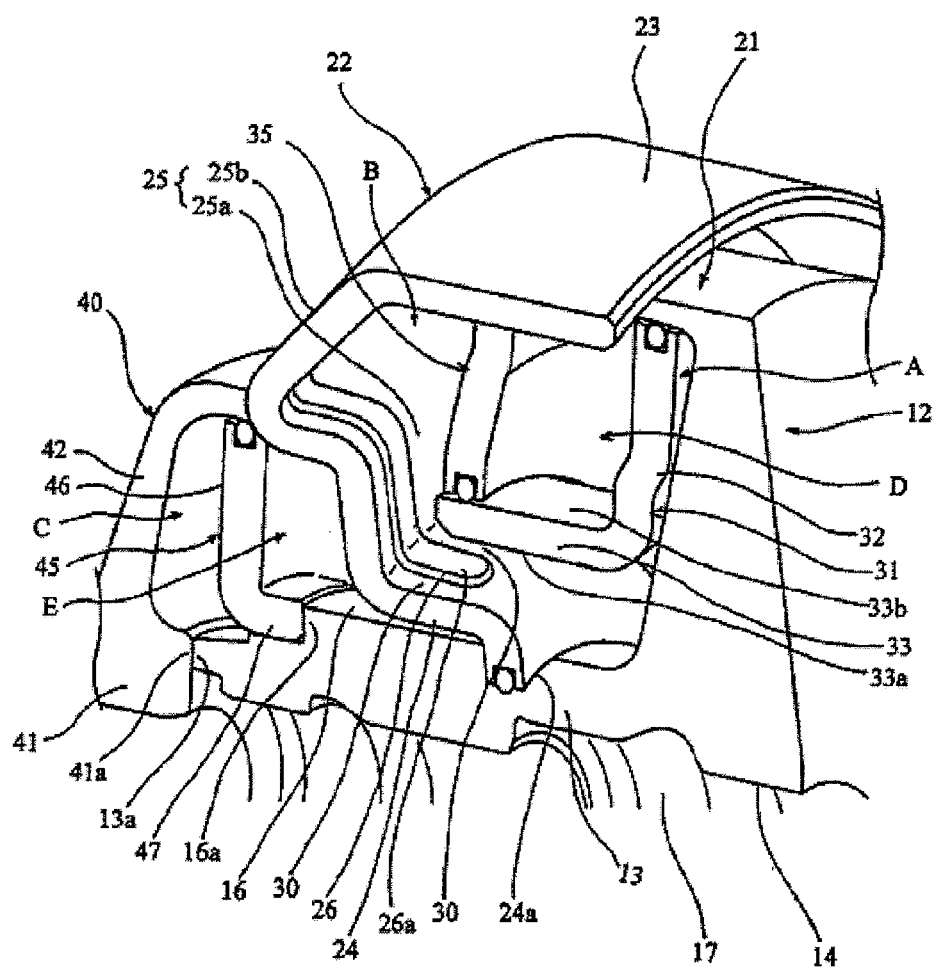
FIG. 5 is a view seen from an arrow G in FIG. 4.
Figure 6:
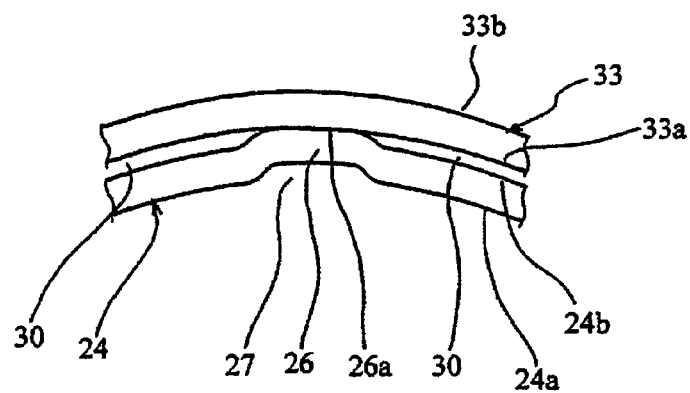
FIG. 6 is a sectional view taken along an I-I line in FIG. 2.
Figure 7:
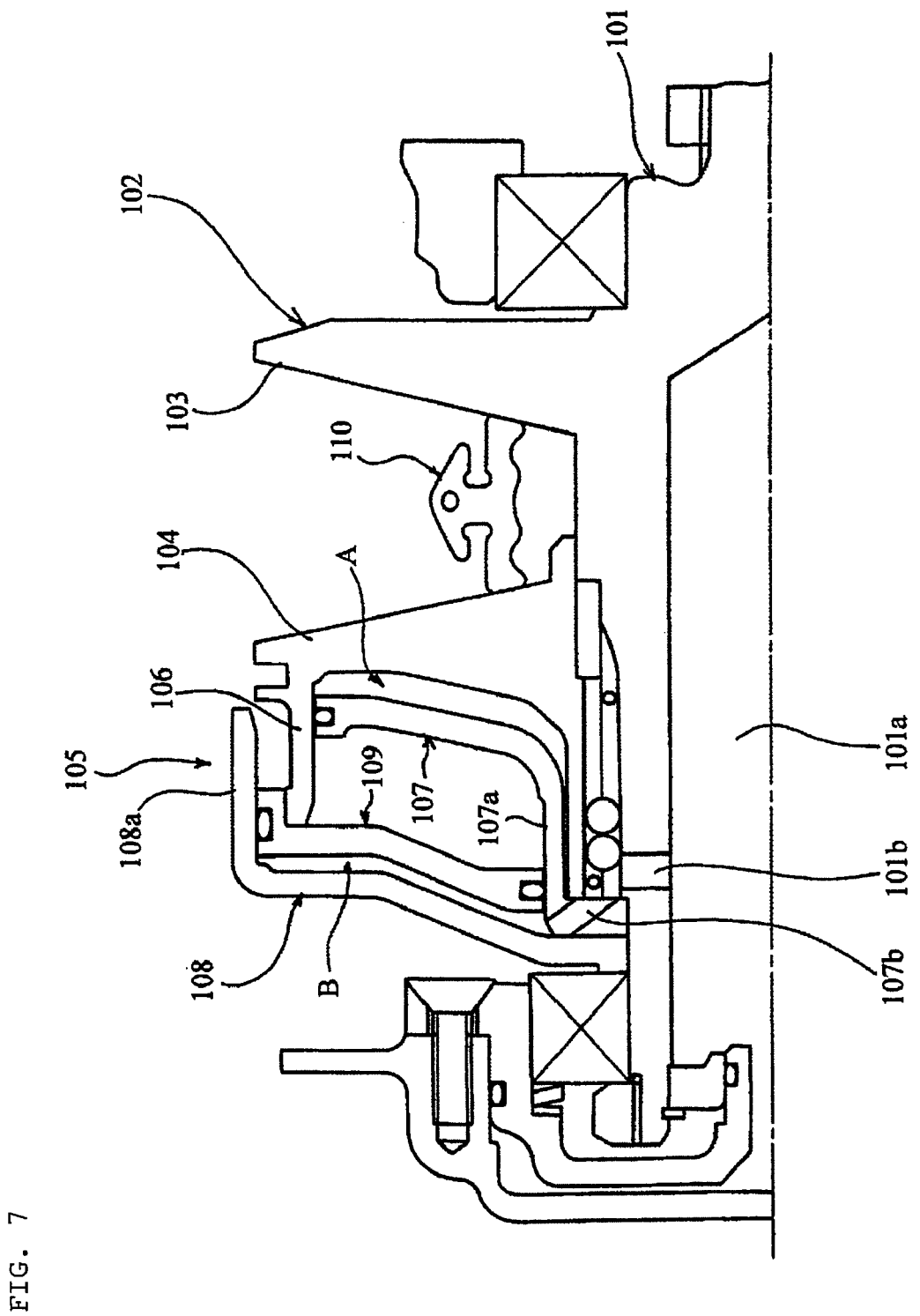
FIG. 7 is a sectional view showing the main parts of a conventional hydraulic actuator for a belt type continuously variable transmission.
Figure 8:
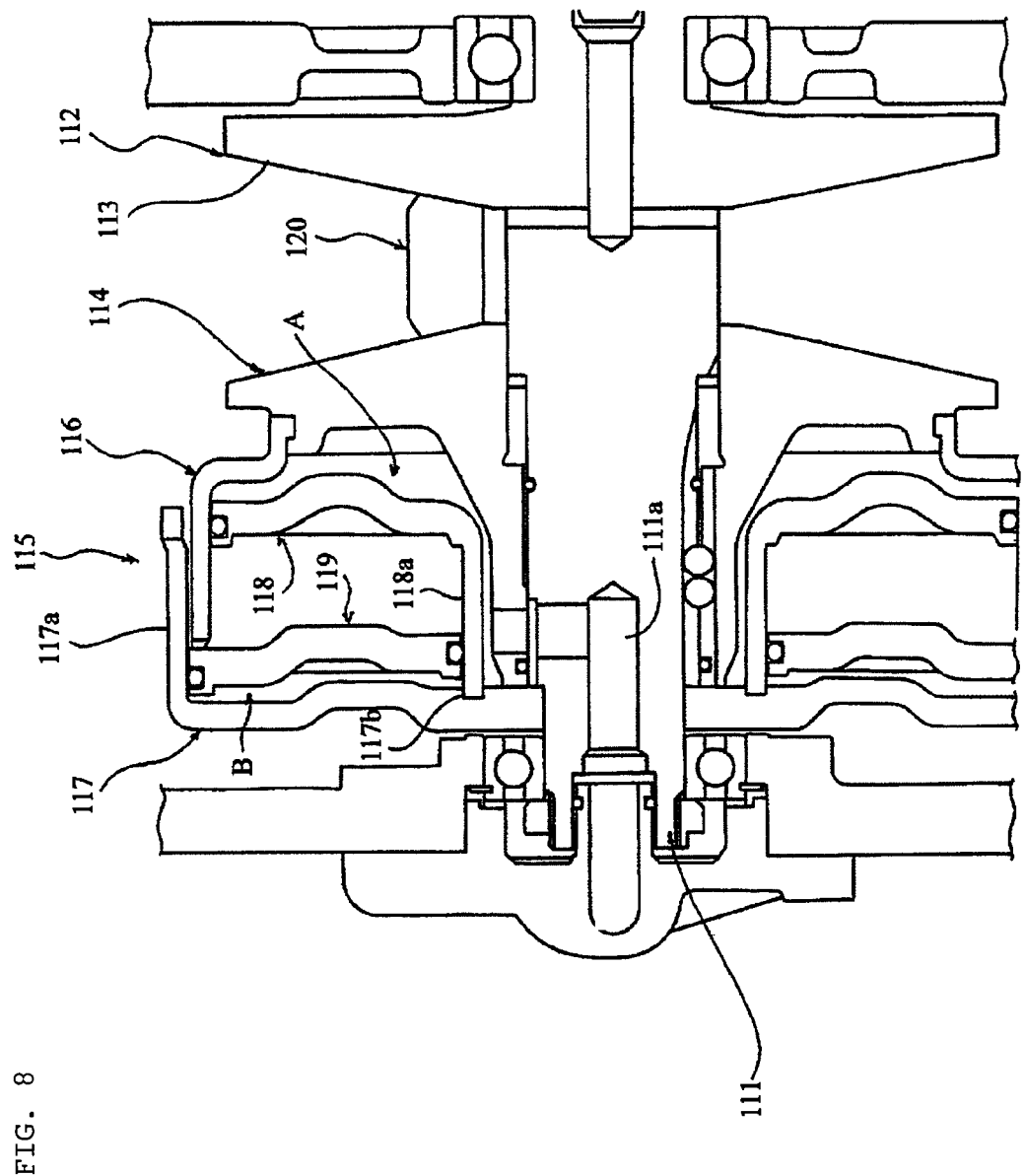
FIG. 8 is a sectional view showing the main parts of a conventional hydraulic actuator for a belt type continuously variable transmission.

FIGS. 1 and 2 are sectional views showing the main parts of a belt type continuously variable transmission 1 when the pulley groove width is at a maximum and a minimum, respectively. FIG. 3 is a partially cut-away perspective view of the hydraulic actuator. FIG. 4 is an enlarged view of an F portion of FIG. 3. FIG. 5 is a view seen from an arrow G in FIG. 4. FIG. 6 is a sectional view taken along an I-I line in FIG. 2.

As shown in FIGS. 1 and 2, a primary pulley 10 includes a fixed sheave 11 formed integrally with a primary shaft 1 serving as a pulley shaft that is driven to rotate by an engine or the like via a clutch or the like, and a movable sheave 12 that is disposed opposite to the fixed sheave 11 to be capable of moving in an axial direction, and a driving belt 50 is wound between the fixed sheave 11 and the movable sheave 12. A hydraulic actuator 20 that variably controls a pulley groove width L of the primary pulley 10 by moving the movable sheave 12 in the axial direction is disposed between a back surface 12a of the movable sheave 12 and the primary shaft 1.

In order from the fixed sheave 11 side, a large diameter pulley bottom portion 2, a movable sheave sliding portion 3 having a smaller diameter than the pulley bottom portion 2 and formed continuously with the pulley bottom portion 2 via a step portion 2a, a cylinder holding portion 4 formed continuously with the movable sheave sliding portion 3 via a step portion 3a, a journal portion 5, and a lock nut screw portion 6 are formed continuously on the primary shaft 1 formed integrally with the fixed sheave 11.

Further, oil pressure supply passages 7, 8 are formed in the primary shaft 1 about an axial center. The oil pressure supply passage 7 opens in the vicinity of the step portion 2a of the pulley bottom portion 2 from an oil passage 7a formed in a diametrical direction, and the oil pressure supply passage 8 opens in the vicinity of the step portion 3a of the movable sheave holding portion 4 from an oil passage 8a formed in the diametrical direction.

In the movable sheave 12, a large diameter portion 14 of a cylindrical boss portion 13 is fitted to the pulley bottom portion 2 of the primary shaft 1 to be free to slide, and a small diameter portion 15 is fitted slidably to the movable sheave sliding portion 3. Although not shown in the drawings, a plurality of opposing ball grooves extending in the axial direction are formed respectively in the movable sheave sliding portion 3 and the small diameter portion 15 such that relative movement in the axial direction is permitted and rotation torque is transmitted by balls interposed between the opposing ball grooves. Further, an oil passage 17 is formed between the large diameter portion 14 and the small diameter portion 15 so as to face the oil passage 7a of the primary shaft 1, and the oil passage 17 communicates with a first hydraulic chamber A, to be described below, via an oil passage 17a drilled into the boss portion 13.

The hydraulic actuator 20 includes a cylindrical first cylinder 21 that projects to the back surface 12a side from an outer periphery of the movable sheave 12, a drum 22, a first plunger 31 that forms the first hydraulic chamber A between itself and the back surface 12a of the movable sheave 12, a second plunger 35 that forms a second hydraulic chamber B between itself and the drum 22, a second cylinder 40, and a third plunger 45 that forms a third hydraulic chamber C between itself and the second cylinder 40.

The drum 22 is formed continuously and integrally with a cylindrical first drum portion 23, which is formed on an outer periphery of the drum 22 and extends in the axial direction so as to cover an outer side of the first cylinder 21 and overlap the first cylinder 21 in the axial direction, a cylindrical second drum portion 24, which is formed on an inner periphery of the drum 22 and extends in the axial direction such that an inner end 24a thereof is fitted slidably to an outer peripheral surface 16 of the boss portion 13 of the movable sheave 12, and a back surface portion 25 that connects an end portion of the first drum portion 23 to the second drum portion 24 and bulges in the axial direction heading away from the back surface 12a of the movable sheave 12. The back surface portion 25 is formed in a ring shape by a ring-shaped first back surface portion 25a which increases in diameter in a substantially planar form from an end portion of the second drum portion 24, and a second back surface 25b which is formed as a continuation of the first drum portion 23 and bulges in a ring shape from the outer periphery of the first back surface portion 25a in the axial direction heading away from the back surface 12a of the movable sheave 12.

Further, as shown in FIG. 4, FIG. 5, and FIG. 6, which is a sectional view taken along an I-I line in FIG. 2, a plurality of bead-shaped projections 26 which extend in the axial direction along from the second drum portion 24 to the first back surface portion 25a and project toward an inner side of the drum 22 are formed at equal intervals in a circumferential direction such that an outer side of the drum 22 forms a recessed groove 27. With this constitution, the drum 22 can be manufactured easily and at low cost from a plate-form material through press-molding, which exhibits superior productivity.

The first plunger 31 is formed integrally with a flat ring-shaped pressure receiving surface 32 which faces the back surface 12a of the movable sheave 12 such that an outer periphery thereof is fitted slidably to an inner peripheral surface 21a of the first cylinder 21 formed so as to project from the movable sheave 12, and a cylindrical portion 33 having a cylindrical shape that forms a continuation of an inner periphery of the pressure receiving surface 32, an inner peripheral surface 33a of which contacts an apex 26a of each projection 26 and is fitted to the second drum 24 of the drum 22.

The second plunger 35 includes a flat plate-shaped pressure receiving surface 36 which faces the back surface portion 25 of the drum 22 such that an inner periphery thereof is fitted slidably to an outer peripheral surface 33b of the cylindrical portion 33 of the first plunger 31, and a cylindrical portion 37 which has a cylindrical shape that forms a continuation of an outer periphery of the pressure receiving surface 36 and is fitted slidably between the outer peripheral surface 21b of the first cylinder 21 and an inner peripheral surface 23a of the first drum portion 23 of the drum 22. The second plunger 35 forms the second hydraulic chamber B between itself and the back surface portion 25 of the drum 22, and forms a first air chamber D between itself and the first plunger 31. Note that the first air chamber D communicates with the atmosphere through a bleeder circuit that is formed by a slit 21c formed in a tip end portion of the first cylinder 21, and therefore the volume of the first air chamber D can be varied easily.

The second hydraulic chamber B and the first hydraulic chamber A are connected by an oil passage 30 formed by a gap between the inner peripheral surface 33a of the cylindrical portion 33 of the first plunger 31 and an outer peripheral surface 24b of the second drum portion 24 of the drum 22, which are fitted and joined via the respective projections 26.

The second cylinder 40 includes a side face portion 42 that increases in diameter from a ring-shaped base portion 41 that is fitted to the cylinder holding portion 4 of the primary shaft 1 and a cylinder portion 43 formed in a cylindrical shape by extending an end 43b thereof from an outer periphery of the side face portion 42 in the axial direction to contact the first back surface portion 25a such that the tip end 43b is fitted into the cylindrical second back surface portion 25b of the drum 22.

When the base portion 41 of the second cylinder 40 is fitted to the cylinder holding portion 4 of the primary shaft 1 such that an end portion 41a thereof contacts the step portion 3a, the second cylinder 40 is fastened by a lock nut 52 screwed into the lock nut screw portion 6, and thereby fixed to the primary shaft 1, via a bearing 51 attached to the journal portion 5. Further, an end portion 13a of the boss portion 13 of the movable sheave 12 contacts the end portion 41a of the base portion 41 such that movement of the movable sheave 12 in the axial direction is restricted, and thus the pulley groove width L of the primary pulley 10 is set at a maximum.

The third plunger 45 is formed integrally with a flat ring-shaped pressure receiving surface 46 which faces the side face portion 42 of the second cylinder 40 such that an outer periphery thereof is fitted slidably to an inner peripheral surface 43a of the cylinder portion 43 formed on the second cylinder 40, and a base portion 47 that has a cylindrical shape forming a continuation of an inner periphery of the pressure receiving surface 46 and is fitted fixedly to a ring-shaped plunger holding portion 16a formed on an end portion of the outer peripheral surface 16 of the boss portion 13 of the movable sheave 12. The third hydraulic chamber C is formed between the third plunger 45 and the side face portion 42 of the second cylinder portion 40, and a second air chamber E is formed between the third plunger 45 and the drum 22. Note that in the second air chamber E, when a tip end 43b of the cylinder portion 43 contacts the first back surface portion 25a of the drum 22, a bleeder circuit 44 that communicates with the atmosphere is formed between the cylinder portion 43 and the back surface portion 25 by a recessed groove 27 formed in the first back surface portion 25a, and therefore, the volume of the second air chamber E can be varied easily.

By causing the cylinder portion 43 of the second cylinder 40 and the back surface portion 25 of the drum 22 to overlap in the axial direction and forming the third hydraulic chamber C and the second air chamber E in the second cylinder 40 by fixing the third plunger 45 to the boss portion 13 of the movable sheave 12 within the range of the axial direction overlap in this manner, a reduction in an axial direction length of the hydraulic actuator 20 can be achieved, leading to an improvement in the compactness of the hydraulic actuator 20.

In the hydraulic actuator 20 for a belt type continuously variable transmission constituted in the manner described above, when the end portion 13a of the boss portion 13 formed on the movable sheave 12 contacts the end portion 41a of the base portion 41 of the second cylinder 40 and the movable sheave 12 moves away from the fixed sheave 11 such that the pulley groove width L of the primary pulley 10 is set at the maximum, as shown in FIG. 1, working oil pressure is introduced into the oil pressure supply passages 7 and 8 formed in the primary shaft 1.

The working oil pressure introduced into the oil pressure supply passage 7 is supplied to the first hydraulic chamber A from the oil passage 7a formed in the primary shaft 1 in the diametrical direction through the oil passages 17 and 17a formed in the movable sheave 12, and supplied to the second hydraulic chamber B through the oil passage 30 formed by the gap between the inner peripheral surface 33a of the cylindrical portion 33 of the first plunger 31 and the outer peripheral surface 24b of the second drum portion 24 of the drum 22.

The working oil pressure of the first hydraulic chamber A causes an operating pressure acting on the pressure receiving surface 32 of the first plunger 31 to be transmitted from the cylindrical portion 33 thereof to the lock nut 52 fastened to the primary shaft 1 via the back surface portion 25 of the drum 22, the second cylinder 40, and the bearing 51. The lock nut 52 receives the operating pressure, whereby the first plunger 31 is fixed, and thus the movable sheave 12 is pushed directly in the direction of the fixed sheave 13 by the working oil pressure of the first hydraulic chamber A.

Meanwhile, the working oil pressure of the second hydraulic chamber B causes an operating pressure acting on the back surface portion 25 of the drum 22 to be transmitted to the lock nut 52 fastened to the primary shaft 1 via the second cylinder 40 and the bearing 51. The lock nut 52 receives the operating pressure, whereby the drum 22 is fixed, and the operating pressure of the second hydraulic chamber B acting on the pressure receiving surface 36 of the second plunger 35 causes the second plunger 35 to move along the inner peripheral surface 23a of the first drum portion 23 of the drum 22 and the outer peripheral surface 33b of the cylindrical portion 33 of the first plunger 31. Thus, the moving force of the second plunger 35 is transmitted to the first cylinder 21 so as to move the movable sheave 12 in the same direction together with the pushing force of the first hydraulic chamber A, and as a result, the pulley groove width L of the primary pulley 10 narrows.

Further, when the movable sheave 12 begins to move as described above, the end portion 13a of the boss portion 13 separates from the base portion 41 of the second cylinder 40 such that an oil pressure passage connecting the oil passage 8a to the third hydraulic chamber C is formed, and the working oil pressure introduced into the oil pressure supply passage 8 is introduced into the third hydraulic chamber C through the oil passage 8a and a gap between the end portion 41a of the base portion 41 and the end portion 13a of the boss portion 13.

The working oil pressure of the third hydraulic chamber C causes an operating pressure acting on the back surface portion 42 of the second cylinder 40 to be transmitted to and received by the lock nut 52 fastened to the primary shaft 1 from the base portion 41 via the bearing 51. The operating pressure of the third hydraulic chamber C acting on the pressure receiving surface 46 of the third plunger 45 causes the third plunger 45 to move along the inner peripheral surface 43a of the cylinder portion 43 and also causes the boss portion 13 to move, and as a result, the movable sheave 12 is moved in the same direction by the operating pressure of the third hydraulic chamber C and the respective pushing forces of the first hydraulic chamber A and the second hydraulic chamber B. Thus, the pulley groove width L of the primary pulley 10 narrows, as shown in FIG. 2.

As a result, an effective winding diameter of the driving belt 50 wound around the primary pulley 10 increases such that a gear ratio transmitted to a secondary pulley, not shown in the drawing, increases.

As the movable sheave 12 moves, the actuating force of the first hydraulic chamber A and second hydraulic chamber B acting on the drum 22 is transmitted to and received by the lock nut 52 fastened to the primary shaft 1 via the second cylinder 40 contacting the back surface portion 25 of the drum 22 and the bearing 51, whereby the drum 22 is fixed in a stable condition. The cylindrical portion 33 of the first plunger 31 is fitted to and held by the second drum portion 24 of the fixed drum 22, and therefore support rigidity is secured in the first plunger 31 so as to prevent the first plunger 31 from tilting and swinging. Hence, smooth movement is secured in the second plunger 35, which moves while remaining slidably fitted to the inner peripheral surface 23a of the first drum portion 23 of the drum 22 and the outer peripheral surface 33b of the cylindrical portion 33 of the first plunger 31, and therefore smooth movement can be secured in the movable sheave 12 in accordance with the hydraulic action of the first hydraulic chamber A, second hydraulic chamber B, and third hydraulic chamber C. As a result, a smooth speed shift is obtained by varying the pulley groove width L of the primary pulley 10.

On the other hand, when the working oil pressure is discharged from the first hydraulic chamber A, second hydraulic chamber B, and third hydraulic chamber C, the movable sheave 12 moves in a direction heading away from the fixed sheave 11 while the second plunger 35 is pushed by the tension of the driving belt 50. As a result, the effective winding diameter of the driving belt 50 is reduced such that the gear ratio relative to the secondary pulley is set to be small. As the movable sheave 12 moves, the actuating force acting on the drum 22 is transmitted to and received by the lock nut 52 fastened to the primary shaft 1 via the second cylinder 40 contacting the back surface portion 25 of the drum 22 and the bearing 51, whereby the drum 22 is fixed in a stable condition. The cylindrical portion 33 of the first plunger 31 is fitted to and held by the second drum portion 24 of the fixed drum 22, and therefore support rigidity is secured in the first plunger 31 so as to prevent the first plunger 31 from tilting and swinging. Hence, smooth movement is secured in the second plunger 35, which moves while remaining slidably fitted to the inner peripheral surface 23a of the first drum portion 23 of the drum 22 and the outer peripheral surface 33b of the cylindrical portion 33 of the first plunger 31, and as a result, a smooth speed shift is obtained by varying the pulley groove width L of the primary pulley 10.

Further, since the oil passage 30 connecting the first hydraulic chamber A to the second hydraulic chamber B is formed by the gap between the inner peripheral surface 33a of the cylindrical portion 33 of the first plunger 31 and the outer peripheral surface 24b of the second drum portion 24 of the drum 22, which are fitted together slidably via the projections 26 formed on the second drum portion 24 of the drum 22, and the drum 22 having the projections 26 can be manufactured easily and at low cost by press-molding, which exhibits superior productivity, the manufacturing cost of the actuator 20 can be reduced greatly.

Note that the present invention is not limited to the embodiment described above, and may be subjected to various modifications within a scope that does not depart from the spirit of the invention. For example, in the above embodiment, a hydraulic actuator that varies a pulley groove width of a primary pulley was described as an example, but the present invention may also be applied to a hydraulic actuator that varies a pulley groove width of a secondary pulley.

What is claimed is:

1. A hydraulic actuator for a belt type continuously variable transmission which has a pulley that includes a fixed sheave formed integrally with a pulley shaft and a movable sheave disposed opposite to said fixed sheave to be capable of moving in an axial direction, a driving belt wound around said pulley, and a hydraulic actuator for moving said movable sheave in said axial direction, and which performs a speed shift by having said hydraulic actuator move said movable sheave such that a ratio of an effective winding diameter of said driving belt relative to said pulley is varied, comprising:
   a first cylinder that projects from a back surface of said movable sheave;
   a drum in which a first drum portion covering said first cylinder, a second drum portion having an inner end that is fitted slidably to an outer peripheral surface of a boss portion of said movable sheave, and a back surface portion connecting an end portion of said first drum portion and an end portion of said second drum portion are formed continuously;
   a first plunger having an outer periphery that is fitted slidably to an inner peripheral surface of said first cylinder and an inner periphery that contacts a projection formed on a peripheral surface of said second drum portion such that a first hydraulic chamber is formed between said first plunger and said back surface of said movable sheave;
   a second plunger having an inner periphery that is fitted slidably to said first plunger and an outer periphery that is fitted slidably to said first drum portion such that a second hydraulic chamber is formed between said second plunger and said back surface portion of said drum;
   a second cylinder formed with a base portion that is fixed to said pulley shaft and a cylinder portion that increases in diameter from said base portion and has an end that contacts said back surface portion of said drum; and
   a third plunger having an outer periphery that is fitted slidably to said cylinder portion of said second cylinder and an inner periphery that is fixed to said boss portion of said movable sheave such that a third hydraulic chamber is formed between said third plunger and said cylinder portion of said second cylinder,
   wherein an oil passage that connects said first hydraulic chamber and said second hydraulic chamber is formed by a gap between said second drum portion and said first plunger, which are fitted together via said projection.

2. The hydraulic actuator for a belt type continuously variable transmission according to claim 1, wherein an oil passage that connects an oil supply passage provided in said pulley shaft and said first hydraulic chamber is formed in said boss portion of said movable sheave.

3. The hydraulic actuator for a belt type continuously variable transmission according to claim 2, wherein said back surface portion of said drum is formed in a ring shape by a ring-shaped first back surface portion that increases in diameter in planar form from an end portion of said second drum portion, and a second back surface portion which bulges in a ring shape from an outer periphery of said first back surface portion in said axial direction heading away from said back surface of said movable sheave, and an outer periphery of which forms a continuation of said first drum portion,
   said cylinder portion of said second cylinder is formed with a cylindrical end that is fitted into said second back surface portion of said drum so as to contact said first back surface portion, whereby said cylinder portion overlaps said drum in said axial direction, and
   said third plunger is fixed to said boss portion of said movable sheave within an axial direction range in which said drum and said cylinder portion overlap.

4. The hydraulic actuator for a belt type continuously variable transmission according to claim 1, wherein said back surface portion of said drum is formed in a ring shape by a ring-shaped first back surface portion that increases in diameter in planar form from an end portion of said second drum portion, and a second back surface portion which bulges in a ring shape from an outer periphery of said first back surface portion in said axial direction heading away from said back surface of said movable sheave, and an outer periphery of which forms a continuation of said first drum portion,
   said cylinder portion of said second cylinder is formed with a cylindrical end that is fitted into said second back surface portion of said drum so as to contact said first back surface portion, whereby said cylinder portion overlaps said drum in said axial direction, and
   said third plunger is fixed to said boss portion of said movable sheave within an axial direction range in which said drum and said cylinder portion overlap.

* * * * *